R. W. GUILFORD.
WASHER.
APPLICATION FILED JAN. 27, 1908.
903,187.
Patented Nov. 10, 1908.
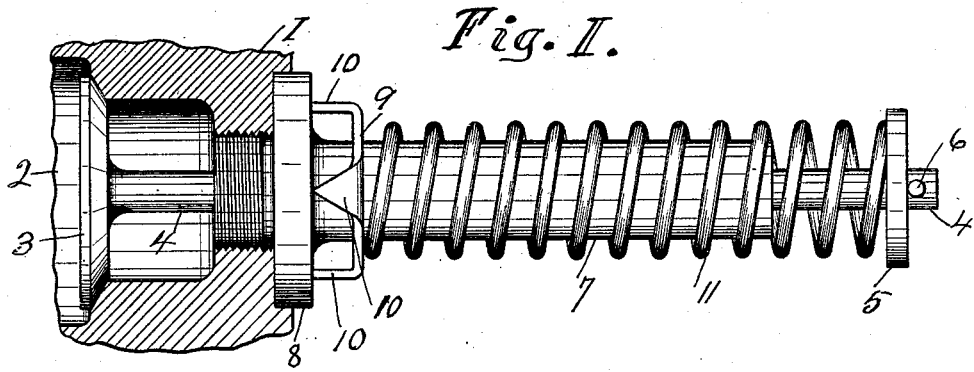
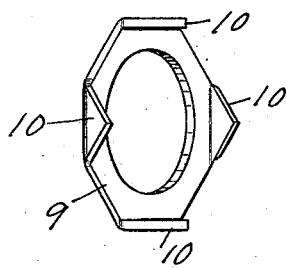 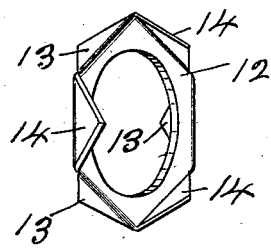 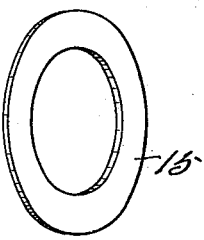
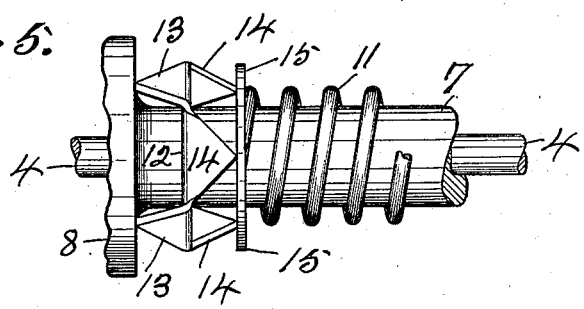
WITNESSES:
Augusta Viberg.
Auguste Spiegel.
Russell W. Guilford INVENTOR
BY Chapin & Denny
His ATTORNEYS.

UNITED STATES PATENT OFFICE.

RUSSELL W. GUILFORD, OF AUBURN, INDIANA, ASSIGNOR TO WILLIAM H. McINTYRE, OF AUBURN, INDIANA.

WASHER.

No. 903,187.  Specification of Letters Patent.  Patented Nov. 10, 1908.

Application filed January 27, 1908. Serial No. 412,747.

*To all whom it may concern:*

Be it known that I, RUSSELL W. GUILFORD, citizen of the United States, residing at Auburn, in the county of Dekalb, in the State of Indiana, have invented certain new and useful Improvements in Washers; and I do hereby declare that the following is a full, clear, and exact description of the invention, which will enable others skilled in the art to which it appertains to make and use the same, reference being had to the accompanying drawings, which form part of this specification.

My invention relates to improvements in washers specially designed and adapted for use upon the valve stem guides of engines.

It is well known that in the inlet and exhaust valves of some engines, particularly of gas engines, the coiled retractile springs which secure the valves upon their seats readily become overheated by contact with the inner end of the valve stem guide which is seated against the highly heated engine body, which thereby soon takes the temper out of such springs, rendering them inefficient and worthless.

The primary object of my present invention is to provide a novel, economical and efficient means for preventing the overheating of such springs in use.

My invention consists of a washer having a plurality of peripheral sharp pointed prongs or lugs arranged in right angular relation with the body of the washer and adapted to separate the inner end of the said spring from its usual heated bearing by an efficient air space, and adapted to present bearing surfaces which will reduce to a minimum the conduction of heat to the spring.

The novel feature of my present invention resides in the provision of a washer having pointed peripheral lugs upon one or both of its faces to reduce to a minimum its contact with the adjacent heated surface of the valve-spring guide.

Similar reference numerals indicate like parts in the several views, in which

Figure 1 is a side view of one form of my invention in position upon a valve-stem guide showing its working relation with the valve-stem, valve-stem spring and engine-body. Fig. 2 is a perspective detail of my invention showing the arrangement of the pointed bearing lugs when arranged only upon one side thereof. Fig. 3 is a perspective view of a modified form of the same showing the arrangement of the pointed lugs upon opposite faces thereof. Fig. 4 is a perspective of a ring-disk which is employed in connection with the said modified form of washer. Fig. 5 is a side view of such modified form of washer in position upon a common form of valve-stem guide partly broken away, and having the forward portion of the coiled spring in position, and also showing the relative and coöperative arrangement of the annular disk.

The engine body 1 of any proper form has the usual valve chambers 2, and valve 3 properly seated and provided with an extended valve-stem 4 having a retaining washer 5 secured against displacement by the diametric pin 6. A suitable tubular guide 7 having an annular flange 8 near its inner end is rigidly secured in a suitable screw-threaded opening in the body portion 1 in the usual or other proper manner. On this valve-stem guide 7 adjacent to the outer face of the flange 8 is loosely mounted my improved washer 9 having a plurality of peripheral prongs or sharp pointed lugs 10 upon its inner face, whose points are adapted to rest upon the said flange, as shown in Fig. 1. On this valve-stem is loosely mounted a coiled retractile spring 11 whose outer end bears against the retaining washer 5, and whose inner end bears against the outer face of the washer 9, as shown, thereby preventing the spring from coming into contact with the heated flange 8.

The washer 9 is preferably stamped from suitable sheet-metal, and has the corners of its four sides bent at right-angles to the body of the washer, as shown in Fig. 2. While this form of the washer 9 has four supporting points, it may have either a greater or less number, and may be of any desired contour.

The modified form 12 of my invention, shown in Figs. 3 and 5, has a plurality of right-angular peripheral prongs, teeth or pointed lugs 13 and 14, preferably six in number, one-half of which are pointed in one direction and one-half in the other direction. In the use of this form 12 of my improved washer a ring-disk 15 is employed, as shown in Fig. 5, adapted to bear against the points of the adjacent lugs 14, having the adjacent inner end of the spring 11 bearing against the other face thereof, while at the same time the points of the lugs 13 bear against the outer face of the flange 8.

It is obvious that by interposing my invention between the heated flange 8 of the valve-stem guide and the inner adjacent end of the valve controlling retractile spring 11 a cooling air space is thus provided, and as the washer 9 touches the heated surface of the flange 8 at the sharp points of the lugs 10, the minimum of conductance will take place between these two bodies, thereby practically eliminating the evil effect of the overheating of the valve-controlling springs.

It is also evident that by employing the form of my invention shown in Figs. 3 and 5 the beneficial effects of my invention are increased, since both sets of pointed lugs aid in reducing the conductance of heat from the flange 8 to the spring 11.

Having thus described my invention and the manner of employing the same what I desire to secure by Letters Patent is:

1. In a gas engine the combination of a valve; a valve stem guide; a retractile spring for the said valve-stem mounted on the said guide; and a washer arranged at the inner end of the said spring having a plurality of angular barbs or prongs adapted to provide an interposed air-space between the body of the washer and a heated surface upon which the said prongs bear, and adapted to reduce to a minimum the conduction of heat to the washer by the contact of their points with such heated surface.

2. A washer for a highly heated surface consisting of an annular plate having its periphery provided with angular prongs adapted to bear at their points upon the said heated surface, thereby providing an interposed air-space between the body of the washer and such heated surface, and reducing to a minimum the conduction of heat from such surface to the washer; a valve stem guide; and a retractile spring mounted on the said guide with its inner end bearing against the said washer, as described.

3. The combination of a valve-stem; a valve stem guide; a coil spring loosely mounted thereon; and a washer adapted to separate the said spring from an adjacent highly heated surface, the said washer comprising an annular plate having a plurality of peripheral prongs whose points bear upon the heated surface and thereby reduce to a minimum the conduction of heat from such surface to the washer by contact therewith, as described.

4. A washer having oppositely bent peripheral points or lugs in combination with a ring-disk adapted to form a bearing for a portion of such lugs.

Signed by me at Auburn, Dekalb county, State of Indiana, this 21st day of January, A. D. 1908.

RUSSELL W. GUILFORD.

Witnesses:
T. W. BUCKLEY.
RALPH P. KING.